(12) United States Patent
Kapoor

(10) Patent No.: US 11,163,704 B2
(45) Date of Patent: *Nov. 2, 2021

(54) METHOD, SYSTEM, AND APPARATUS FOR REDUCING PROCESSOR LATENCY

(71) Applicant: International Business Machines Corporation, Armonk, NY (US)

(72) Inventor: Shakti Kapoor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 85 days.

This patent is subject to a terminal disclaimer.

(21) Appl. No.: 16/597,530

(22) Filed: Oct. 9, 2019

(65) Prior Publication Data

US 2020/0042467 A1 Feb. 6, 2020

Related U.S. Application Data

(63) Continuation of application No. 15/850,247, filed on Dec. 21, 2017, now Pat. No. 10,482,040.

(51) Int. Cl.
*G06F 13/00* (2006.01)
*G06F 13/16* (2006.01)
*G06F 12/0811* (2016.01)
*G06F 12/0888* (2016.01)
*G06F 3/06* (2006.01)
*G06F 12/0802* (2016.01)

(52) U.S. Cl.
CPC ............ *G06F 13/161* (2013.01); *G06F 3/061* (2013.01); *G06F 3/064* (2013.01); *G06F 3/0622* (2013.01); *G06F 12/0802* (2013.01); *G06F 12/0811* (2013.01); *G06F 12/0888* (2013.01); *G06F 13/1673* (2013.01); *G06F 2212/283* (2013.01); *G06F 2212/6046* (2013.01); *G06F 2212/621* (2013.01)

(58) Field of Classification Search
None
See application file for complete search history.

(56) References Cited

U.S. PATENT DOCUMENTS 7,099,913 B1 8/2006 Bertone et al.
7,565,461 B2 7/2009 Huppenthal et al.
(Continued)

OTHER PUBLICATIONS

IBM, "A Method for Verifying the Correct Ordering of MMIOs and Invalidation Requests Across an IO Bridge", IP.com Prior Art Database Technical Disclosure, IP.com No. IPCOM000014068D, Jun. 19, 2003, 3 pages.

(Continued)

*Primary Examiner* — Midys Rojas
(74) *Attorney, Agent, or Firm* — Scully, Scott, Murphy & Presser, P.C.

(57) ABSTRACT

Disclosed is a method, apparatus, and/or computer program product for reducing latency in a processor with regard to the execution of noncacheable operations that includes receiving noncacheable operations from one or both of the level 2 cache and a level 3 cache, sending the noncacheable operations to a noncacheable unit (NCU) associated with a core of the processor, executing the noncacheable operations by the NCU, and sending results of the executed noncacheable operations to a host bridge for output to an input/out device. The noncacheable operations bypass the core of the processor.

20 Claims, 3 Drawing Sheets

(56) References Cited

U.S. PATENT DOCUMENTS

| | | |
|---|---|---|
| 8,161,242 B2 | 4/2012 | Qureshi |
| 8,429,386 B2 | 4/2013 | Jordan et al. |
| 8,473,644 B2 | 6/2013 | Deshpande et al. |
| 9,196,383 B2 | 11/2015 | Dang et al. |
| 9,286,148 B1 | 3/2016 | Arimilli et al. |
| 9,342,387 B1 | 5/2016 | Arimilli et al. |
| 2001/0018721 A1 | 8/2001 | McKenna et al. |
| 2010/0013839 A1 | 1/2010 | Rawson |
| 2010/0030970 A1 | 2/2010 | Qureshi |
| 2010/0333098 A1 | 12/2010 | Jordan et al. |
| 2018/0373656 A1 | 12/2018 | Kuwabara et al. |

OTHER PUBLICATIONS

International Search Report and Written Opinion of the International Searching Authority issued in International Application No. PCT/IB2018/059874 dated Mar. 11, 2019.

List of IBM Patents or Patent Applications Treated as Related.

METHOD, SYSTEM, AND APPARATUS FOR REDUCING PROCESSOR LATENCY

CROSS-REFERENCE TO RELATED APPLICATIONS

This patent document is a continuation of, and claims priority to, U.S. patent application Ser. No. 15/850,247, filed Dec. 21, 2017. The disclosure of the priority application is fully incorporated by reference.

BACKGROUND

This disclosure generally relates to processor operation handling, and more specifically relates to a system and method for reducing latency in computer processors related to delivery of data from processor to the devices or agents in the system.

In a typical processor core, the largest store available is a sixteen byte store. Therefore, it requires it takes eight stores to push a 128-byte line from the processor to the memory mapped input/output ("MMIO") space of an input/out ("IO") card. A noncacheable unit ("NCU") store gathers these stores so that a full line is output on the main bus to be delivered to the IO card thru the processor host bridge. These operations add to the latency for noncacheable operations because the NCU must wait for all the stores to complete before pushing the line to the MMIO space of the IO card. These operations require data to be transferred within the processor through caches and processor registers before being sent to the NCU for execution and output to the IO card.

SUMMARY

A method, apparatus, and computer program product is disclosed that reduces latency problems in computer processors by eliminating the need to utilize the processor core for store operations to noncacheable memory locations, such as an input/output ("IO") card. The apparatus includes a processor chip containing a processor core, a level 2 cache, and a level 3 cache. The apparatus may also include or be in communication with a host bridge and an TO card.

The method may be executed in a coherent engine implemented in a level 2 cache of a processor. The method includes receiving noncacheable operations from one or both of the level 2 cache and a level 3 cache, sending the noncacheable operations to a noncacheable unit ("NCU") associated with a core of the processor, executing the noncacheable operations by the NCU, and sending results of the executed noncacheable operations to a host bridge for output.

In an implementation of the method apparatus and computer program, the noncacheable operations are received in a plurality of data messages. In this implementation, the noncacheable operations may be sent to a buffer and sent to the NCU when they are complete.

In another implementation of the apparatus, method, and computer program product, the coherent engine includes a plurality of registers. A first register of the coherent engine stores a memory start address of a source of the noncacheable operation. A second register of the coherent engine stores a size of the noncacheable operation. A third register of the coherent engine stores a destination address on an input/output interface that is in communication with the host bridge. The method may determine whether the whether the noncacheable operation is complete based on the value stored in the second register. The method may determine where to send the results of the executed noncacheable operation based on the value stored in the third register.

BRIEF DESCRIPTION OF THE SEVERAL VIEWS OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
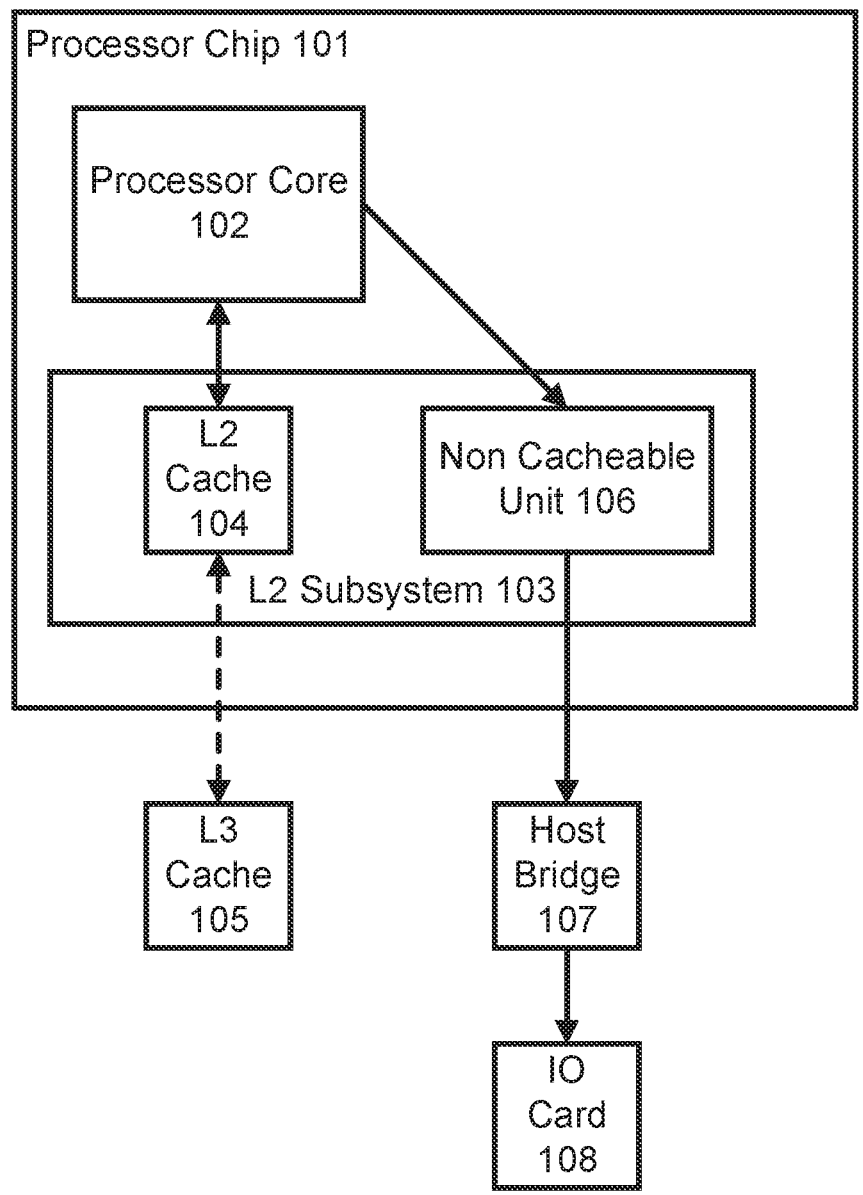
FIG. 1 is a block diagram of a processor.

Referring now to FIG. 1, a conventional processor chip 101 is shown. This processor chip 101 includes a processor core 102 and a level 2 ("L2") cache 103. The L2 cache 103 is a cache memory that temporarily stores information from a main memory that needed for the processing of operations and instructions in the processor core 102, often in conjunction with a level 1 cache (not shown in FIG. 1 for simplicity) located in the processor core 102 itself. L2 subsystem 103 includes L2 cache 104 and a noncacheable unit ("NCU")

106. The NCU 106 is responsible for handling instruction-serializing functions and performing any noncacheable operations in the storage hierarchy. Located off the processor chip 101 is a level 3 ("L3") cache 105 that temporarily stores information from the main memory needed for the processing of operations and instructions in the processor core 102 and a host bridge 107 that interfaces with input/output devices, such as peripheral cards connected through a peripheral component interconnect ("PCI") interface. Input/output ("IO") card 108 is shown in FIG. 1 as an example. A person of ordinary skill would understand the 10 card 108 may be any connected peripheral or any device requiring information from the processor chip 101.

As shown in FIG. 1, data in a conventional processor flows from the L2 cache 108 or from the L3 cache 105 through the L2 cache 104 to the processor core 102. Store operations by processor core 102 may be limited by word size. For example, the largest store operation by processor core 102 may be 16 bytes. Thus, it would require eight (8) consecutive stores to push a 128-byte line from the processor to the IO card 108. The NCU 106 collects the 16-byte stores and outputs the full 128-byte line to the host bridge 107 when it is complete. The line is then transferred to the appropriate output device, such as IO card 108. This process adds considerable latency to the execution of the noncacheable operations and to the operation of the processor generally.

Figure 2:
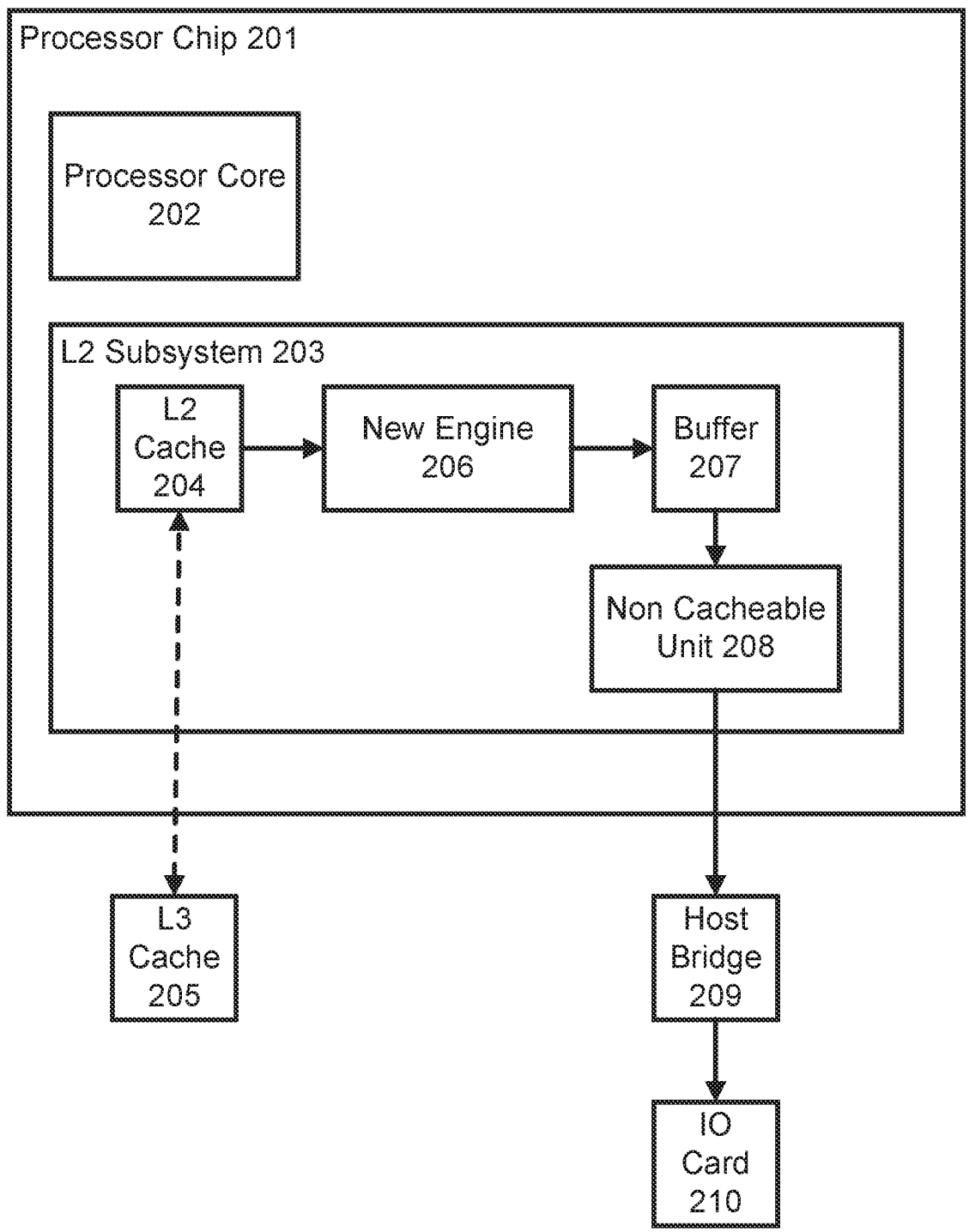
FIG. 2 is a block diagram of a processor.

Referring now to FIG. 2, an improved processor chip 201 is shown. Processor chip 201 includes processor core 202 and L2 subsystem 203. L2 subsystem includes L2 cache 204, a new coherent engine 206, buffer 207, and NCU 208. Off the processor chip 201 is L3 cache 205, host bridge 209 and IO card 210. The L2 cache 204 and L3 cache 205 is, for example, a cache memory that temporarily stores information from a main memory that needed for the processing of operations and instructions in the processor core 202, often in conjunction with a level 1 cache (not shown in FIG. 2 for simplicity) located in the processor core 202 itself New coherent engine 206 includes three registers for storing information. A source register stores the memory start address of the source of the data being sent to the NCU 208. A data size register stores the size of the data, for example, the amount of memory required by the data being sent to the NCU 208. Finally, a destination register stores a destination memory location address of the data. In the example of FIG. 2, this destination register would store an address on the IO card 210. Implemented at level 2, the new coherent engine 206 collects data from the L2 cache 204 or L3 cache 205 through L2 cache 204 using the above described registers that are populated in a single store. The coherent engine 206 then sends data to the NCU 208 which outputs the data to the host bridge 209 and eventually the IO card 210. This process eliminates the need to use processor core cycles to send data to the NCU 208.

Figure 3:
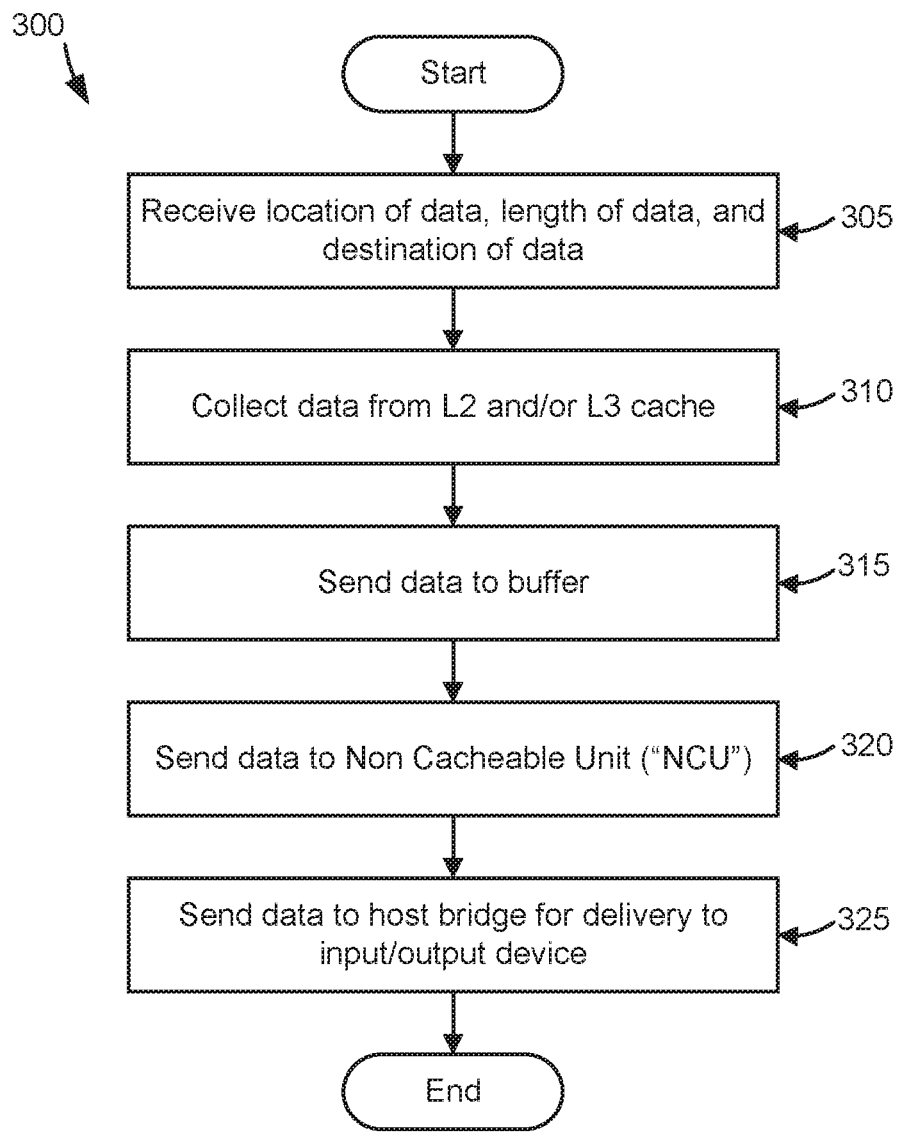
FIG. 3 is flowchart for a method of reducing latency in a processor, according to one embodiment described herein.

Referring now to FIG. 3, a flow diagram is shown that describes a method of using the improved processor shown in FIG. 2. At step 305, the coherent engine receives data that indicates the memory location, the length or size, and the destination address of data that is to be output to the host bridge on the front side bus by the NCU. At step 310, the coherent engine collects data from the specified location in the L2 and/or the L3 cache. At step 315, the data is sent to a buffer that collects data as it is retrieved from the memory locations and combines them. At step 320, the combined data is then sent to the NCU, where noncacheable operations are executed. At step 325, the resulting data is then sent to the host bridge on the front side bus for delivery to an input/output device or any receiving agent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to various embodiments, other and further embodiments of the invention may be devised without departing from the basic scope thereof, and the scope thereof is determined by the claims that follow.

The invention claimed is:

1. A processor for handling data, the processor comprising:
a processor core;
a coherent engine having a plurality of registers for storing data, the coherent engine implemented in a level 2 subsystem of the processor and configured to retrieve data from a source memory location and store it at a destination location bypassing the processor core;
a non-cacheable unit ("NCU") implemented in the level 2 subsystem of the processor and configured to perform non-cacheable operations, wherein the NCU is associated with the core of the processor.

2. The processor according to claim 1, wherein the plurality of registers includes a source register configured to store a source memory location address pointing to the source memory location and a destination register configured to store a destination memory location address pointing to the destination memory location.

3. The processor according to claim 2 wherein the plurality of registers further includes a data size register configured to store a size of data stored at the source memory location.

4. The processor according to claim 1 wherein the non-cacheable unit is configurable to communicate with an input/output ("IO") card, and the destination memory location is on the IO card.

5. The processor according to claim 1, further comprising a buffer configured to buffer data retrieved from the source memory location and to send complete data to the NCU.

6. The processor according to claim 5, wherein the buffer is configured to combine the data retrieved from the source memory location.

7. The processor according to claim 1, further comprising a level 2 cache, wherein the source memory location is in the level 2 cache.

8. The processor according to claim 7, wherein the level 2 cache is configured to be in communication with a level 3 cache off the processor, and wherein the source memory location is in the level 3 cache.

9. The processor of claim 1, wherein the coherent engine is configured to receive information that indicates a source location of data to be received by the coherent engine, a size of the data to be received, and a destination location for the data.

10. The processor according to claim 1, wherein the coherent engine is configured to retrieve data from the source location.

11. The processor according to claim 1, wherein the coherent engine is configured to send the retrieved data to the NCU.

12. The processor according to claim 1, wherein the coherent engine is configured to send the retrieved data to a buffer where the retrieved data is collected and combined.

13. The processor according to claim 12, wherein the combined data is sent to the NCU.

14. The processor according to claim 1, wherein the coherent engine is configured to retrieve data from the source location and send the data to the NCU where non-cacheable operations are performed, wherein the data avoids the processor core.

15. A method of handling non-cacheable data in a processor, the method comprising:
  receiving, at a coherent engine implemented in a level 2 subsystem of the processor, a source location, data size information, and a destination location for the non-cacheable data;
  retrieving, by the coherent engine, the non-cacheable data from the source location;
  sending, by the coherent engine, the non-cacheable data to a noncacheable unit (NCU) wherein the non-cacheable data bypasses a core of the processor.

16. The method of claim 15, wherein the non-cacheable data is received in a plurality of operations, and the method further comprising buffering the non-cacheable data in a buffer implemented in the level 2 subsystem of the processor; combining the non-cacheable data received from the plurality of operations; and sending the combined non-cacheable data to the NCU.

17. The method of claim 15, further comprising:
  storing the source location in a first register of the coherent engine;
  storing the data size in a second register of the coherent engine; and
  storing the destination location in a third register of the coherent engine.

18. The method of claim 15, wherein the source location is located in one of a level 2 cache and a level 3 cache.

19. The method of claim 15, further comprising performing non-cacheable operations by the NCU.

20. The method of claim 15, further comprising sending the data to the destination location.

* * * * *